(12) United States Patent
Amiot et al.

(10) Patent No.: US 7,584,618 B2
(45) Date of Patent: Sep. 8, 2009

(54) CONTROLLING AIR FLOW TO A TURBINE SHROUD FOR THERMAL CONTROL

(75) Inventors: Denis Amiot, Dammarie les Lys (FR); Frederick Duny, Le Plessis Trevise (FR); Jérôme Friedel, Blandy les Tours (FR); Christian Kaincz, Le Mee sur Seine (FR); Delphine Roussin-Moynier, Antony (FR)

(73) Assignee: Snecma, Paris (FR)

( * ) Notice: Subject to any disclaimer, the term of this patent is extended or adjusted under 35 U.S.C. 154(b) by 597 days.

(21) Appl. No.: 11/151,452

(22) Filed: Jun. 14, 2005

(65) Prior Publication Data

US 2005/0276690 A1 Dec. 15, 2005

(30) Foreign Application Priority Data

Jun. 15, 2004 (FR) .................................. 04 06468

(51) Int. Cl.
*F02C 6/08* (2006.01)
(52) U.S. Cl. ...................................... 60/782
(58) Field of Classification Search ................. 60/782, 60/785, 795; 415/1, 14, 17, 47, 48, 173.2, 415/173.3, 175–178
See application file for complete search history.

(56) References Cited

U.S. PATENT DOCUMENTS

| 4,303,093 A | 12/1981 | Swindler | |
| 4,338,061 A * | 7/1982 | Beitler et al. | 415/1 |
| 4,849,895 A * | 7/1989 | Kervistin | 701/100 |
| 4,928,240 A * | 5/1990 | Davison et al. | 701/100 |
| 5,012,420 A * | 4/1991 | Walker et al. | 701/100 |
| 6,035,929 A | 3/2000 | Friedel et al. | |
| 6,487,491 B1 * | 11/2002 | Karpman et al. | 701/100 |

FOREIGN PATENT DOCUMENTS

GB 2104966 A 3/1983

* cited by examiner

*Primary Examiner*—Michael Cuff
*Assistant Examiner*—Andrew Nguyen
(74) *Attorney, Agent, or Firm*—Rothwell Figg, Ernst & Manbeck, PC

(57) ABSTRACT

A system for controlling a flow of air applied to a gas turbine shroud in an airplane engine, the air flow being adjusted by a regulator valve of position that is controlled by a first control signal calculated on the basis of a first setpoint value corresponding to predetermined clearance between the rotor and the turbine shroud. The system further comprises means for calculating at least one second control signal based on a second setpoint value different from the first value representative of clearance in the turbine, and selector means for selecting the second control signal to control the regulator valve in response to one or more engine parameters. With such a system, it is possible to control the air flow applied to the shroud in application of a plurality of control logic systems.

22 Claims, 2 Drawing Sheets

CONTROLLING AIR FLOW TO A TURBINE SHROUD FOR THERMAL CONTROL

BACKGROUND OF THE INVENTION

The present invention relates to high pressure turbines, such as those used in airplane engines, and in which the clearance between the tips of the rotor blades and the stator shroud is controlled by means of a flow of air following at a rate that is controlled.

FIG. 1 shows a high pressure turbine 100 of a turbomachine comprising mainly a plurality of moving blades 102 disposed in a stream 105 of hot gas coming from the combustion chamber (not shown). The moving blades 102 of the turbine are surrounded by a shroud or ring 106. The shroud 106 is secured to a casing 108 of the turbine via a plurality of spacer sectors 110.

In order to increase the efficiency of such a turbine, it is known that the clearance j that exists between the tips of the moving blades 102 of the turbine rotor and the shroud 106 must be reduced to as little as possible.

For this purpose, a device 112 for controlling the clearance j is mounted around the casing 108 of the turbine. This control device 112 comprises in particular annular air-flow manifolds 114 which serve to discharge air onto annular fins 116 of the casing 108 in order to modify the temperature thereof.

The control device 112 is fed with air taken from other portions of the turbomachine (fan or high pressure compressor stage(s)). The flow of air injected into the device 112 is itself controlled by a valve 120 disposed upstream from the device 112. The valve 120 is fitted with an actuator controlled by a control signal Scom which positions the valve in an arbitrary position lying in the range 0% to 100% of its opening so as to determine the flow Fi of air that is injected into the device 112.

The control signal Scom is calculated by a regulator loop which compares the existing clearance j between the tips of the rotor blades and the shroud with a setpoint value corresponding to a predetermined clearance value that is to be reached or maintained. The flow of air Fi injected into the device 112 is then adjusted as a function of the received control signal Scom, thereby enabling the annular fins 116 of the casing 108 to be expanded or contracted thermally so as to vary the diameter of the shroud 106 of the turbine in such a manner as to bring the clearance j to the setpoint value.

However, as explained above, the regulator valve is controlled solely with respect to a single type of setpoint value, i.e. a value representative of predetermined clearance between the tips of the rotor blades and the shroud. This is explained in particular by the fact that this control logic is implemented during the cruising stage of a flight, i.e. the stage that represents the major fraction of flying time. Although controlling clearance enables engine efficiency to be improved, and consequently enables fuel consumption under cruising conditions to be improved, this criterion is not necessarily of greatest priority during other stages of operation of the engine, for example while idling or while taking off, for which potential fuel savings are negligible or for which actually implementing the desired control is not possible (e.g. clearance too great at low temperature while idling).

Thus, with present-day systems, it is not possible to control the flow rate of the air on the basis of setpoint values other than that corresponding to the clearance between the tips of the blades and the turbine shroud.

OBJECT AND BRIEF SUMMARY OF THE INVENTION

The present invention seeks to remedy the above-mentioned drawbacks and to provide a system that enables the flow of air delivered to a turbine shroud to be controlled in application of at least one setpoint value other than that corresponding to predetermined clearance between the rotor and the shroud.

This object is achieved with a system for controlling a flow of air applied to the shroud of a gas turbine in an airplane engine, the flow of air being adjusted by a regulator valve of position that is controlled by a first control signal calculated on the basis of a first setpoint value corresponding to predetermined clearance between the rotor and the turbine shroud, the system further comprising, in accordance with the invention, means for calculating at least one second control signal based on a second setpoint value different from the first value representing turbine clearance, and selector means for selecting the second control signal to control the regulator valve in response to one or more engine parameters.

Thus, the flow rate of the air that is applied to the turbine shroud can be controlled in compliance with setpoint values other than the value representative of clearance between the blades and the shroud, the system having means for changing the type of controlling setpoint while it is in operation.

In an embodiment of the invention, the second setpoint value corresponds to a predetermined turbine temperature or to a predetermined degree of valve opening.

When the second setpoint value corresponds to a determined temperature of the turbine, the selector means may select the second control signal in response to one or more engine parameters that enable rises in temperature due to wear to be detected. When the second setpoint value corresponds to a predetermined degree of valve opening, the selector means may select the second control signal in response to one or more engine parameters that serve to detect the engine operating at an idle speed or a failure in the first control signal.

In another embodiment of the invention, the system further comprises means for calculating a third control signal based on a third setpoint value different from the first and second setpoint values, the selector means selecting this third control signal for controlling the regulator valve in response to one or more engine parameters.

When the second setpoint value corresponds to a predetermined temperature of the turbine, the third setpoint value may correspond to a predetermined degree of valve opening. Conversely, when the second setpoint value corresponds to a predetermined degree of valve opening, the third setpoint value may correspond to a predetermined temperature of the turbine.

The means for calculating the control signal may comprise means for reconstituting initial conditions of the engine as a function of one or more engine parameters. This makes it possible to initialize the mathematical model(s) used for calculating the control signal with the real conditions in which the machine is to be found.

The flow of air as controlled by the system of the invention may be air taken from the fan or from one or more compressor stages of the engine.

The object of the invention is also achieved by a method of controlling an air flow applied to a shroud of a gas turbine in an airplane engine, the air flow being adjusted by a regulator valve of position that is controlled by a first control signal calculated from a first setpoint value corresponding to predetermined clearance between the rotor and the turbine shroud, in which method, in accordance with the invention, at least one second control signal is also calculated based on a second setpoint value different from the first value representing clearance in the turbine, and said second control signal is selected for controlling the regulator valve in response to one or more parameters of the engine.

The second setpoint value may correspond to a predetermined temperature of the turbine, in which case the second signal control is selected in response to one or more engine parameters serving to detect temperature rises due to wear, or to a predetermined degree of valve opening, the second control signal then being selected in response to one or more engine parameters that make it possible to detect when the engine is operating at an idling speed or to detect a failure of the first control signal.

In an implementation, a third control signal is also calculated based on a third setpoint value that is different from the first and second setpoint values, i.e. a predetermined temperature of the turbine or a predetermined degree of valve opening, depending on the value selected for the second setpoint value, with the third control signal that is calculated as a function of one or the other setpoint value being selected in response to one or more engine parameters, as described above.

BRIEF DESCRIPTION OF THE DRAWINGS

Other characteristics and advantages of the invention appear from the following description of particular embodiments of the invention given as non-limiting examples, and described with reference to the accompanying drawings, in which.

DETAILED DESCRIPTION OF EMBODIMENTS OF THE INVENTION

Figure 1:
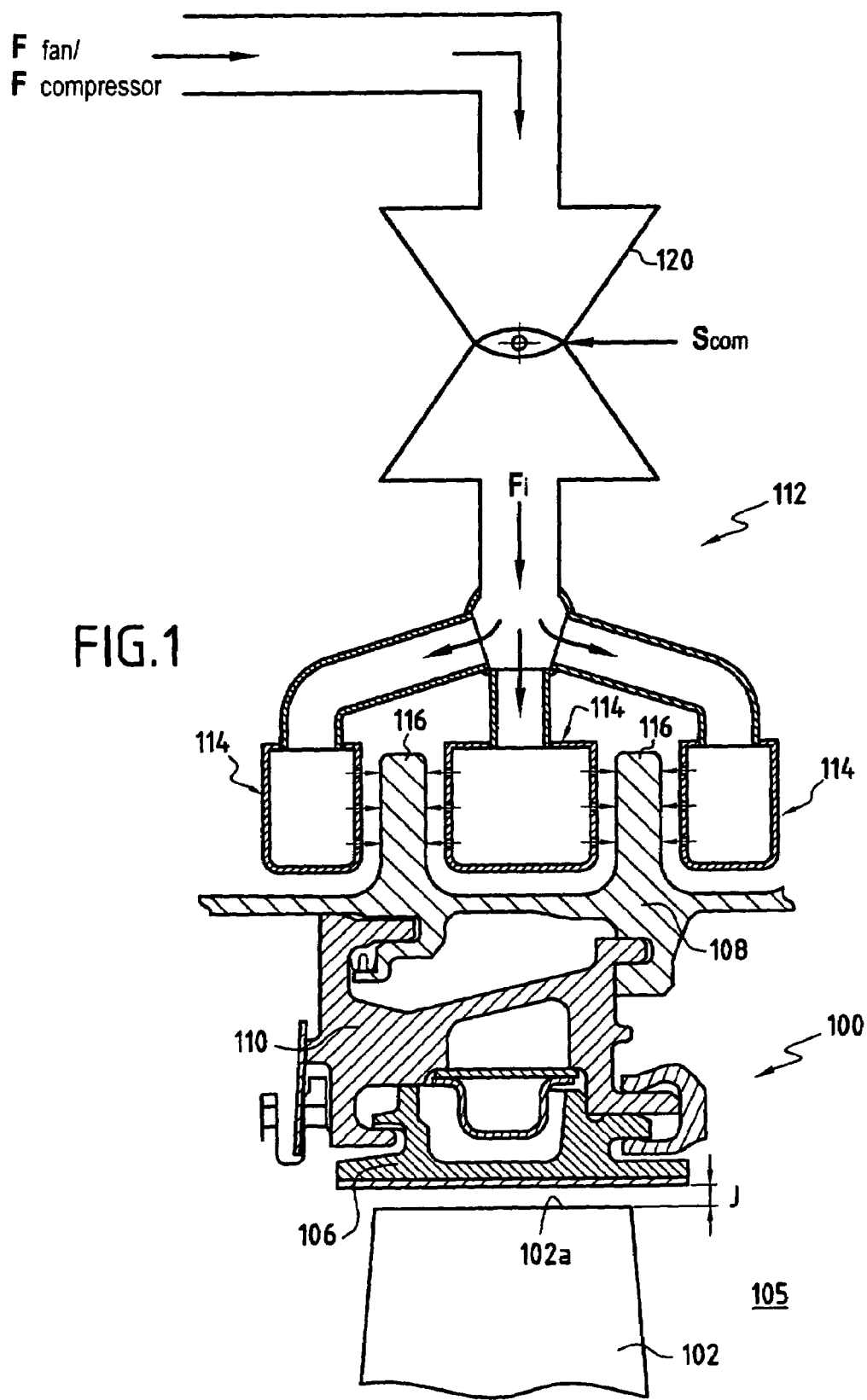
FIG. 1, described above, is a diagrammatic view of a device for controlling the flow of air onto a high pressure turbine shroud.
Figure 2:
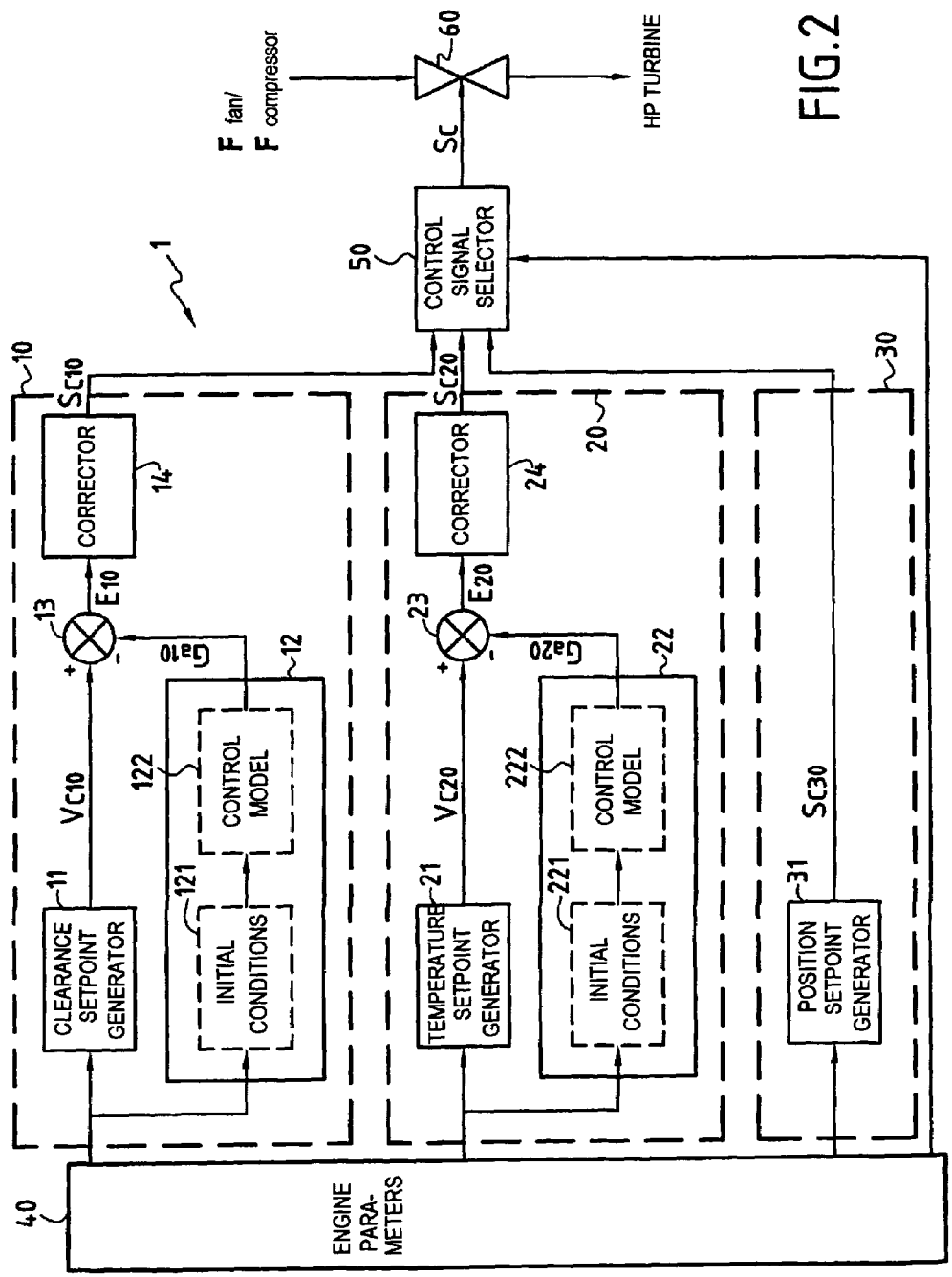
FIG. 2 is a block diagram of an embodiment of a system in accordance with the present invention.

In accordance with the invention, FIG. 2 shows a simplified model of an embodiment of a system 1 for logically selecting the form of control applied to the air flow injected into a high pressure turbine of an airplane engine. As already known, the system 1 firstly comprises a processor system or regulator loop 10 for controlling the clearance between the turbine blade tips and its shroud, as described above with reference to FIG. 1. The loop comprises a setpoint generator 11 which calculates the desired clearance that ought to be achieved for certain parameters of the engine 40 (engine speed, consumption, pressure, . . . ) as obtained from sensors present in the engine. The generator 11 delivers a setpoint value $Vc_{10}$ to a comparator 13 which also has an input receiving a servo-controlled magnitude $Ga_{10}$ corresponding to the instantaneous value of the clearance. The servo-controlled magnitude $Ga_{10}$ is calculated by a modeling unit 12 which comprises a mathematical model 122 for calculating the clearance that exists between the blade tips and the turbine shroud, since such clearance cannot be measured directly. Clearance is modeled on the basis of relationships for thermal and mechanical behavior that have previously been established both for the rotor and for the stator.

The clearance between the blade tips and the shroud depends not only on the thermal expansions and contractions of the rotor and stator portions, but also on the mechanical deformation of the parts such as, for example, the blades lengthening under the centrifugal force of the rotor or the inside diameter of the shroud increasing due to the pressure inside the engine. For this purpose, the modeling unit 12 receives the engine settings 40 needed for calculating clearance on the basis of the model. The operating parameters of the engine as measured and used for calculating clearance are constituted, for example, by the turbine speed, by the rotor and stator temperatures, and by the internal and external pressures in the vicinity of the turbine.

The modeling unit 12 further comprises a module 121 for reconstituting initial conditions serving to initialize or "reset" the model during the first few instants of operation of the regulator loop. The model has behavior relationships for use in predicting the displacements of the parts as a function of parameters (temperature, pressure, rotor speed, consumption, etc.) measured in the motor. Nevertheless, the behavior relationships are generally not linear and correspond to predictions that vary, depending on an operating time scale of the engine. Consequently, the model must initially be initialized with the conditions that apply to the engine. In particular, it is necessary to "inform" the model about the cold or hot starting conditions of the engine so as to enable it to interpret properly the measured parameters that it uses. By way of example, when hot-starting the engine, the mechanical displacements of the elements of the engine are greater than those that occur when cold-starting, and until thermal equilibrium is reached at the operating point of the engine. This phenomenon also leads to clearance j between the rotor blade tips and the shroud being different. This initial stage can be reconstituted by using parameters (temperatures, down times, . . . ) that are measured from the engine.

The modeling unit 12 delivers a servo-controlled magnitude $Ga_{10}$ which corresponds to a value for the clearance that exists between the rotor blades and the turbine shroud. This magnitude $Ga_{10}$ is compared with the setpoint value $Vc_{10}$ in a comparator 13 which outputs a value $E_{10}$ representative of the difference between the existing clearance magnitude $Ga_{10}$ and the setpoint value $Vc_{10}$ that is to be reached. The value $E_{10}$ is forwarded to a corrector 14 which transforms the difference calculated by the comparator 13 into a control signal $Sc_{10}$ for application to the regulator valve 60 in order to cause the appropriate flow of air to be delivered to the turbine for achieving the desired clearance.

As explained with reference to FIG. 1, air is injected into the turbine casing so as to vary the diameter of the shroud, and thus the clearance between the rotor blades and the shroud. The air injected into the turbine may be extracted either from the fan, or else from one or more high pressure compressor stages, thus making it possible to obtain flows at different temperatures. For reasons of simplification, the means for regulating the flow rate of air taken from the fan or from the compressor are represented by a valve 60 controlled by a control signal Sc. nevertheless, the person skilled in the art will have no difficulty in envisaging other suitable forms of regulator means, in particular the presence of one or more regulator valves, particularly when air is taken from a plurality of compressor stages.

The other portions of the system implemented in accordance with the invention are described below. They comprise mainly the presence of at least one other processor system 20 or 30 and a device 50 for selecting which control signal to deliver to the valve 60.

The processor system 20 differs from the system 10 in that the valve control logic relies on a setpoint value $Vc_{20}$ that corresponds to a temperature value instead of to a turbine clearance value. For this purpose, like for the system 10, the processor system 20 includes a setpoint generator 21 which delivers a temperature setpoint value $Vc_{20}$ to a modeling unit 22 which uses a mathematical model 222 associated with a module 221 for reconstituting initial values, to calculate a servo-controlled magnitude $Ga_{20}$ correspond to a temperature value, followed by a comparator 23 that calculates the difference $E_{20}$ between the value $Ga_{20}$ and the setpoint $Vc_{20}$, and a corrector 24 which transforms the difference $E_{20}$ into a control signal $Sc_{20}$ for the purpose of controlling the position of the valve 60 in order to reach the setpoint value. The value $Ga_{20}$ is obtained by the same process as that described above for the value $Ga_{10}$, but with a model that comprises solely relationships for temperature behavior. The parameters measured in the engine and used by the modeling unit 22 are identical to those used by the modeling 12 (temperature, pressure, rotor speed, consumption, etc.).

The temperature setpoint value $Vc_{20}$ is generated as a function of parameters measured in the engine. These parameters may correspond to the temperature, the pressure, the rotor speed, and the consumption of the engine.

The processor system 20 serves to control the temperature of turbine elements during stages of operation in which controlling clearance remains unspecified or whenever the lifetime of the parts is more important than the efficiency of the engine. This applies, for example, when the engine presents a degree of wear that reduces its performance. Specific fuel consumption and exhaust gas temperature then increase with increasing numbers for operating hours or utilization cycles of the engine. When the engine ages, extra fuel is fed into the engine in order to obtain the required thrust. This increase in fuel consumption leads to a temperature increase in the turbine, and that can reduce the lifetime of certain parts which already present a degree of aging, such as the turbine casing. Controlling the air flow as a function of temperature then makes it possible to control the temperature of these parts and thus makes it possible to increase their lifetime, in particular during stages of flight where demand for thrust is high, such as while taking off.

Selecting between the clearance control signal $Sc_{10}$ and the temperature control signal $Sc_{20}$ is performed by the selector 50 in response to one or more parameters it receives from the engine parameters 40. By way of example, the degree of aging of an engine is proportional to the increase in the exhaust gas temperature (EGT). The selector 50 can thus monitor exhaust gas temperature so that above a certain threshold it selects the control signal $Sc_{20}$ to act as the signal Sc for application to the valve 60 so that it is then controlled in terms of a temperature setpoint value instead of a clearance setpoint value. There exist other stages of operation in which it can be advantageous to control the valve in terms of temperature rather than in terms of clearance. Such stages occur, for example, while operating at high temperature, as happens when climbing while the airplane is maximally loaded, or when using an engine towards the end of its lifetime. The fact that one of these stages has been reached is detected on the basis of parameters measured on the engine (temperature, pressure, rotor speed, consumption, etc.), thus enabling the most suitable control logic to be selected automatically.

The system of FIG. 2 includes another processor system 30 for controlling the valve directly in terms of position. For this purpose, the system 30 merely comprises a setpoint generator 31 that delivers a setpoint value directly in the form of a control signal $Sc_{30}$ corresponding to the degree or percentage of valve opening as determined in the range 0% to 100%.

This kind of control logic is useful, particularly during stages of operation of the engine when there is no specified clearance between the blades and the turbine shroud and when the temperatures generated in the turbine are well below the temperature levels that could damage the parts of the turbine. Such stages correspond essentially to when the engine is idling on the ground. In order to select the position control signal $Sc_{30}$ as the control signal Sc for application to the valve 30, the selector 50 monitors, for example, engine speed parameters such as rotor speed in order to detect when the engine is idling. Optionally, temperature, pressure, or consumption parameters may also be taken into account by the selector for performing position control of the valve.

The control signal $Sc_{30}$ may also act as a default positioning signal in the event of valve control using one of the other processor systems failing. Under such circumstances, the selector 50 replaces the failed control signal with the control signal $Sc_{30}$ in response to information indicating control failure, so as to ensure that the valve is placed in a determined position.

The system and the method as described above are implemented in programmable processor means (e.g. a microcontroller) of well-known type. The system and the method of the invention may be programmed and implemented in an electronic engine control (EEC) unit, for example.

What is claimed is:

1. A system for controlling a flow of air applied to the shroud of a gas turbine in an airplane engine, comprising:
    a regulator valve for adjusting the flow of air wherein said regulator valve is adapted to be controlled by a control signal, including a first control signal calculated on the basis of a first setpoint value corresponding to predetermined clearance between the rotor and the turbine shroud,
    means for calculating at least one second control signal for controlling said regulator, said second control signal being based on a second setpoint value corresponding to a predetermined engine condition other than clearance between the rotor and the turbine shroud, and
    selector means for selecting the first control signal or second control signal to control the regulator valve in response to one or more engine parameters,
    wherein the second setpoint value corresponds to a predetermined turbine temperature.

2. The system of claim 1, wherein the selector means is configured to select the second control signal in response to one or more engine parameters that indicate temperature rises due to wear.

3. the system of claim 1, further comprising means for calculating a third control signal based on a third setpoint value different from the first and second setpoint values, wherein the selector means is configured to select the first, second, or third control signal for controlling the regulator valve in response to one or more engine parameters.

4. the system of claim 3, wherein the third setpoint value corresponds to a predetermined degree of valve opening.

5. A system according to claim 1, further comprising means for calculating a third control signal based on a third setpoint value corresponding to a predetermined degree of valve opening, wherein the selector means is configured to select the third control signal in response to one or more engine parameters serving to detect that the engine is operating at idling speed or to detect failure of the first control signal.

6. A system according to claim 1, further comprising means for calculating a third control signal based on a third setpoint value, corresponding to a predetermined turbine temperature, wherein the selector means is configured to select the third control signal in response to one or more engine parameters that indicate a determined level of wear.

7. A system according to claim 1, wherein the means for calculating the control signal include means for reconstituting initial conditions of the engine as a function of one or more engine parameters.

8. A system according to claim 1, wherein the air flow applied to the turbine shroud is taken from the fan or from one or more compressor stages of the engine.

9. A method of controlling an air flow applied to a shroud of a gas turbine in an airplane engine, the air flow being adjusted by a regulator valve that is controlled by a control signal including a first control signal calculated from a first setpoint value corresponding to predetermined clearance between the rotor and the turbine shroud, the method comprising:
    calculating at least one second control signal based on a second setpoint value corresponding to a predetermined engine condition other than clearance between the rotor and the turbine shroud, and
    selecting the first control signal or second control signal for controlling the regulator valve in response to one or more parameters of the engine,
    wherein the second setpoint value corresponds to a predetermined turbine temperature.

10. The method of claim 9, wherein the second control signal is selected in response to one or more engine parameters that indicate temperature rises due to wear.

11. The method of claim 9, further comprising calculating a third control signal based on a third setpoint value different from the first and second setpoint values, and selecting the first, second, or third control signal for controlling the regulator valve in response to one or more engine parameters.

12. The method of claim 11, wherein the third setpoint value corresponds to a predetermined degree of valve opening.

13. A method according to claim 9, further comprising calculating a third control signal based on a third setpoint value corresponding to a predetermined degree of valve opening, and selecting the third control signal in response to one or more engine parameters that indicate operation of the engine at idling speed, or that indicate a failure of the first control signal.

14. A method according to claim 9, further comprising calculating a third control signal based on a third setpoint value corresponding to a predetermined turbine temperature, and selecting the third control signal in response to one or more engine parameters that indicate a determined degree of wear.

15. A method according to claim 9, including the step of reconstituting the initial conditions of the engine as a function of one or more engine parameters prior to performing the step of calculating the first or second control signal.

16. A method according to claim 9, wherein the air flow applied to the turbine shroud is taken from the fan or from one or more compressor stages of the engine.

17. A method according to claim 9, wherein the first control signal is a clearance control signal.

18. A method according to claim 9, wherein the second control signal is a temperature control signal.

19. A system according to claim 1, wherein the first control signal is a clearance control signal and the second control signal is a temperature control signal and wherein the selector means is configured for selecting between the clearance control signal and the temperature control signal.

20. A system according to claim 1, further comprising a processor system for controlling the regulator valve directly in terms of position.

21. A system according to claim 20, wherein a control signal is delivered to the regulator valve directly from a setpoint generator.

22. A system for controlling air flow within the shroud of a gas turbine of an airplane engine, the system comprising:
    a regulator valve constructed and arranged to regulate the flow of air within the shroud in response to regulator control signals;
    a signal generator constructed and arranged to generate a first regulator control signal based on a predetermined clearance between the shroud and a rotor of the airplane engine and a second regulator control signal based on a predetermined engine condition other than clearance between the shroud and a rotor of the airplane engine;
    sensors for detecting one or more engine parameters; and
    a selector for selecting the first regulator control signal or the second regulator control signal in response to one or more engine parameters detected by the sensors, wherein the second regulator control signal corresponds to a predetermined turbine temperature.

* * * * *